United States Patent [19]
Hanna et al.

[11] Patent Number: 5,227,408
[45] Date of Patent: Jul. 13, 1993

[54] CARBON DIOXIDE BLOWN POLYURETHANE PACKAGING FOAM WITH CHEMICAL NUCLEATING AGENTS

[75] Inventors: Todd A. Hanna, Crozier; David L. Haley, Chesterfield; Stuart L. Watson, Midlothian, all of Va.

[73] Assignee: E. R. Carpenter Company, Inc., Richmond, Va.

[21] Appl. No.: 712,876

[22] Filed: Jun. 11, 1991

[51] Int. Cl.$^5$ .................. C08J 9/08; C08G 18/08
[52] U.S. Cl. .................. 521/130; 521/131; 521/133; 521/170; 521/908
[58] Field of Search ............ 521/130, 131, 133, 170, 521/908

[56] References Cited

U.S. PATENT DOCUMENTS

| | | | |
|---|---|---|---|
| 3,876,567 | 4/1975 | Larkin et al. | 521/131 |
| 3,879,315 | 4/1975 | Watkinson et al. | 521/131 |
| 3,882,052 | 5/1975 | Raynor et al. | 521/131 |
| 4,264,744 | 4/1981 | Milovanovic et al. | 521/131 |
| 4,454,251 | 6/1984 | Frisch et al. | 521/131 |
| 4,621,105 | 11/1986 | Statton et al. | 521/130 |
| 4,711,910 | 12/1987 | Statton et al. | 521/130 |
| 4,960,804 | 10/1990 | Doerge | 521/130 |
| 4,986,928 | 1/1991 | Merchant | 521/131 |
| 5,037,860 | 8/1991 | Parrish et al. | 521/131 |
| 5,100,925 | 3/1992 | Watson, Jr. et al. | 521/131 |
| 5,114,980 | 5/1992 | Lii et al. | 521/131 |

FOREIGN PATENT DOCUMENTS

| | | |
|---|---|---|
| 8933069 | 1/1990 | Australia. |
| 0355872 | 1/1990 | European Pat. Off.. |
| 2237024 | 4/1991 | United Kingdom. |
| 2237025 | 4/1991 | United Kingdom. |

Primary Examiner—John Kight, III
Assistant Examiner—Rabon Sergent
Attorney, Agent, or Firm—Beveridge, DeGrandi, Weilacher & Young

[57] ABSTRACT

A method of preparing polyurethane packaging foam for dispensing into a container in which an article is present to be packaged for shipping, wherein the temperature of the polyurethane foam being dispensed into the container is reduced, as is the maximum reaction exotherm temperature. The method involves reacting polymeric isocyanate and polyoxyalkylated polyol precursors in the presence of water as the blowing agent for the foam. A nucleating agent is present in at least one of the precursors and is present in an amount sufficient to reduce the dispensing temperature of the foam reaction product but also the exotherm as the reaction continues to completion. Incorporation of a nucleating agent into the isocyanate and polyol resin components results in a carbon dioxide blown polyurethane packaging foam preferably having a density of 0.2 lb./ft.$^3$ to 2.0 lb./ft.$^3$.

2 Claims, 1 Drawing Sheet

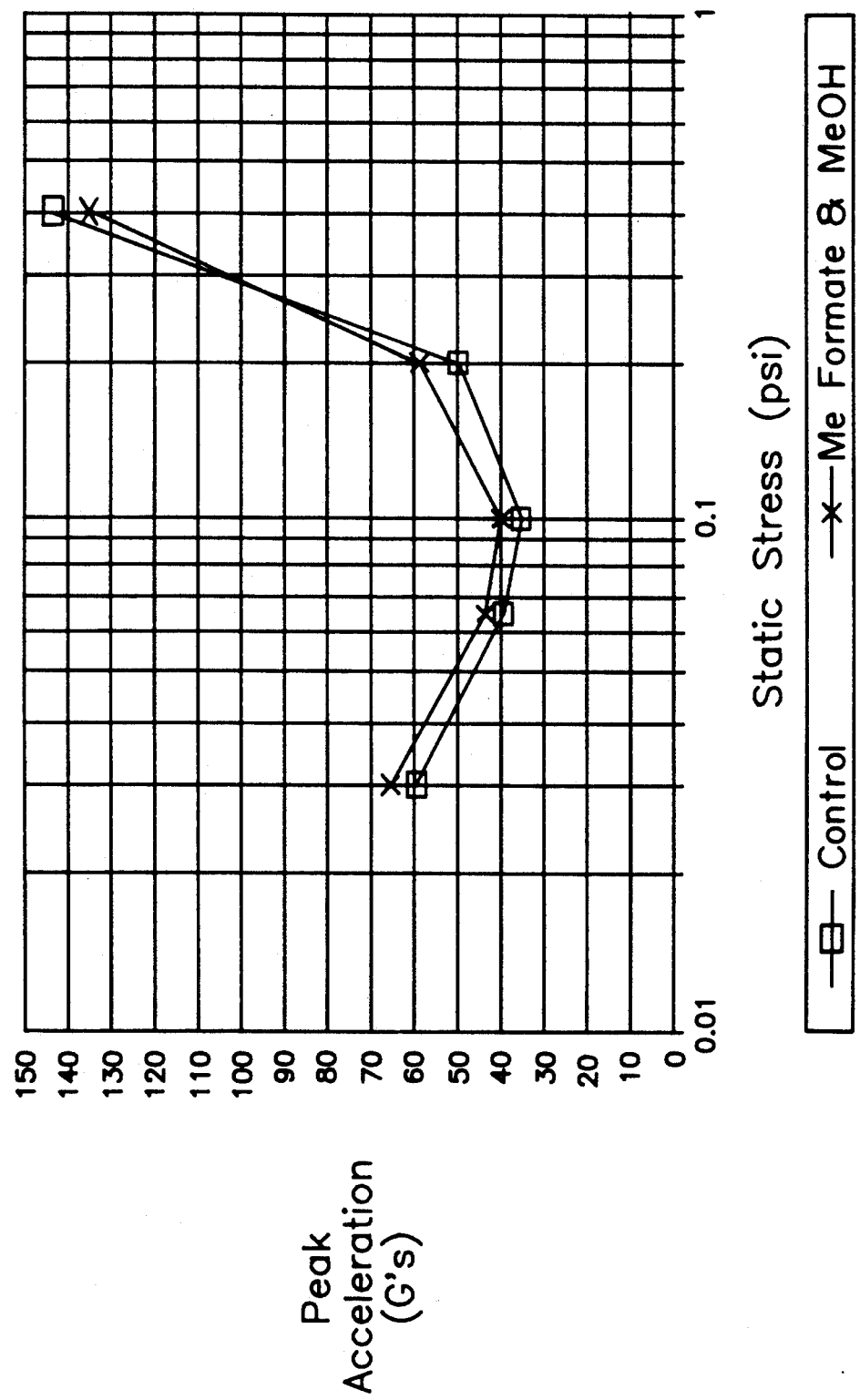

CARBON DIOXIDE BLOWN POLYURETHANE PACKAGING FOAM WITH CHEMICAL NUCLEATING AGENTS

BACKGROUND OF THE INVENTION

The present invention relates to a method of preparing polyurethane packaging foam for dispensing into a container in which an article is present to be packaged for shipping, wherein the temperature of the polyurethane foam being dispensed into the container is lower, as is the maximum reaction exotherm temperature.

Foam-in-place polyurethane packaging foam provides a custom made barrier of defense for products against shock, vibration, and impact and protects such products during shipment. Products are placed in a carton into which liquid foam is dispensed, usually from a foam dispensing gun commonly used in the industry. Isocyanate and polyol precursors are separately introduced into a mixing chamber within the gun. The reaction takes place instantaneously and the reaction product is promptly dispensed into the container and continues reacting and expanding about the article in the container which is being packaged. The container is usually closed while the reaction continues so as to substantially completely fill the spaces about the article with polyurethane foam. The foam cures, expanding up to 200 times its liquid volume and filling the space around the product.

Generally, polyurethane foam precursors are shipped in separate containers of specially blended "A" and "B" liquids. The foam-in-place packaging equipment at the customer's location separately conducts the precursors from the containers to the dispensing gun where the two components are mixed in a mixing chamber to form the polyurethane foam. The "A" component is usually the polymeric isocyanate and the "B" component principally contains polyoxyalkylated polyol and water.

Water reacts with a portion of the polymeric isocyanate to form carbon dioxide, which serves as a blowing agent for the foam. Heat is both a reactant and a product of this reaction. Heat is used to initiate the reaction and the precursors are heated as they travel through heated chemical conduits from their respective containers to the dispensing gun. Additionally, heat is exothermically generated from the reaction of the isocyanate and the polyol and serves to cure the foam quickly. Such heat is referred to as an exotherm.

Prior to the Montreal Protocol mandate, trichloromonofluoromethane (CFC-11) was used as an auxiliary blowing agent. CFC-11 containing systems not only required less initial heat, but also produced a lower exotherm. However, the use of fluorocarbons is being discouraged because of the adverse effect they have on the atmosphere and, in particular, the ozone layer at the higher altitudes.

The extra heat required to blow with carbon dioxide strains the heated chemical conduits. The heat produced from the reaction of an isocyanate, polyol and water, wherein carbon dioxide is formed as the blowing agent, is higher than when CFC-11 blowing is present and would potentially adversely affect the product being packaged. The present invention resulted from a need to reduce the liquid dispensing temperatures of the reaction product as well as the maximum reaction exotherms in carbon dioxide blown polyurethane packaging foams. Most electronic components packaged in foam-in-place polyurethane packaging foam are sensitive to heat, therefore the less heat evolved, the less potential for damage.

Polyurethane slabstock foam processing utilizes the incorporation of air bubbles into the mixing chamber. A more efficient reaction will occur due to the hypothesis that air bubbles provide nucleating sites for the chemicals to react. The present invention allows nucleating sites to form and produces a similar situation in a two component system wherein the liquid polyurethane foam is being dispensed from a foam dispensing gun of a foam-in-place packaging equipment.

SUMMARY OF THE INVENTION

An object of the present invention is to provide a method of preparing polyurethane packaging foam which reduces liquid dispensing temperatures as well as maximum reaction exotherms in carbon dioxide blown polyurethane packaging foam.

According to the present invention, this and other objects are achieved by adding less than about one percent by weight of a nucleating agent to the polymeric isocyanate and/or adding less than about one percent by weight of a nucleating agent to the polyoxyalkylated polyol.

Incorporation of a nucleating agent into the isocyanate and polyol resin components results in a carbon dioxide blown polyurethane packaging foam preferably having a density of 0.2 lb./ft.$^3$ to 2.0 lb./ft.$^3$.

BRIEF DESCRIPTION OF THE DRAWING

FIG. 1 is a dynamic cushioning curve for a product of the present invention and for the control product.

DETAILED DESCRIPTION OF THE INVENTION

Nucleating sites are chemically formed in both the "A" and "B" components. Different chemicals are used to form these nucleating sites depending on the reaction with the polyol resin or polymeric isocyanate. Nucleating agents include methanol, methyl formate, n-pentane, isopentane, methylene chloride, and methyl chloroform or mixtures thereof. It is expected that ethyl formate and any paraffinic alcohol containing less than or equal to five carbon atoms (including isomers) should perform equally well. It is also expected that any inert component (e.g., CFCs or HCFCs) having a boiling point less than 50° C. would suffice. The nucleating agents may preferably be used in concentration of greater than or equal to 0.5 percent to less than or equal to 1.0 wt percent per precursor component. Preferably, methyl formate is added to the polymeric isocyanate and methanol is added to the polyol resin; these chemicals are added to the respective components in concentrations less than one percent by weight.

CFC-11, HCFC-123 ($CF_3CHCl_2$), HCFC-141b ($CCl_2FCH_3$), HCFC-22 (per UNEP), HCFC-124 ($CHClFCF_3$), HCFC-142b ($CH_3CClF_2$), HCFC-152a ($CH_3CHF_2$), air and microspheres and mixtures thereof can be utilized as nucleating agents when water is present as the blowing agent.

Methyl formate boils at 32° C. When the reaction temperature exceeds 32° C., methyl formate is volatilized and the gaseous bubbles act as nucleating sites. These gas bubbles are analogous to the nucleating air present in slabstock foam processing. Increasing the flow of gas (measured in standard cubic feet per minute) through the mixing chamber will decrease initial dispensing temperatures required to produce the same quality of foam.

The process is dissimilar for methanol. As the polymeric isocyanate and polyol resin are mixed, the methanol/methylene bis (phenylisocyanate) (MDI) reaction will go to completion first. Minute solid particles are the product of the methanol and MDI reaction, which particles ultimately act as nucleating sites. It was found that the more nucleating sites available to the reaction components, the greater the reduction in liquid dispensing temperature and maximum heat of reaction.

Since packaging foams are predominantly open celled, the excess methyl formate gas is volatilized. Urea crystals formed by the methanol/MDI reaction are suspended in the polymeric structure. Physical property tests yielded identical results for foam made using nucleating agents and for foam made without nucleating agents.

The following examples in table 1 demonstrate the liquid dispensing temperature reduction, lower exotherm, and identical physical properties of the present invention.

TABLE 1

|  | CONTROL | MF[1] | MeOH[2] | MF & MeOH[3] |
|---|---|---|---|---|
| Polyol resin for 0.4 lb./ft.$^3$ foam | 100.0% | 100.0% | 99.1% | 99.1% |
| Polymeric isocyanate (MDI) | 100.0% | 99.1% | 100.0% | 99.1% |
| Nucleating chemical (conc.) | 0.0% | 0.9% | 0.9% | 1.8% |
| Processing range[4] | 150–165° F. | 135–160° F. | 135–160° F. | 130–155° F. |
| Core exotherm[5] | 270° F. | N.D | N.D. | 250° F. |
| Dynamic cushioning | attached graph | N.D. | N.D. | attached graph |

[1]Methyl Formate (HCOOCH$_3$)
[2]Methanol (CH$_3$OH)
[3]Methyl Formate and Methanol
[4]To produce foam with a uniform cellular structure, minimum 16 cells per linear inch, via a Carpenter Packaging Company 5500 dispensing system (1.8:1.0 liquid pressure to air pressure ratio pogo pump). The processing range temperatures are the initial liquid dispensing temperatures which produce acceptable foam at a 1:1 mixing ratio by volume.
[5]One cubic foot foam sample As can be seen in Table 1, the processing range for the present invention is wider than for the control (25° F. vs. 15° F.). In addition, the midpoint of the processing range for making acceptable foam is 15° F. lower when using the present invention (143° F.) versus the control (158° F.). Such lower temperature is very significant in the foam-in-place packaging methods used in the industry.

Table 2 shows the processing range for various nucleating agents of the present invention.

TABLE 2

|  | control | methyl formate | methanol | MF and methanol | HCFC 22 | HCFC 142b | HCFC 141b |
|---|---|---|---|---|---|---|---|
| Polyol resin for 0.4 pcf foam* | 100.0 | 100.0 | 99.1 | 99.1 | 98.5 | 99.5 | 99.0 |
| Polymeric Isocyanate (MDI) | 100.0 | 99.1 | 100.0 | 99.1 | 100.0 | 100.0 | 100.0 |
| Nucleating chemical | 0 | 0.9 | 0.9 | 1.8 | 1.5 | 0.5 | 1.0 |
| Processing range (degree F.)+ | 150–165 | 135–160 | 135–160 | 130–155 | 135–160 | 140–165 | 140–160 |

|  | HCFC 123 | HCFC 123 | methylene chloride | n-pentane | CFC-11 | microspheres |
|---|---|---|---|---|---|---|
| Polyol resin for 0.4 pcf foam* | 98.0 | 99.0 | 99.0 | 99.0 | 99.0 | 99.8 |
| Polymeric Isocyanate (MDI) | 100.0 | 100.0 | 100.0 | 100.0 | 100.0 | 100.0 |
| Nucleating chemical | 2.0 | 1.0 | 1.0 | 1.0 | 1.0 | 0.2 |
| Processing range (degree F.)+ | 135–165 | 140–165 | 140–165 | 135–165 | 140–165 | 140–165 |

Air Nucleation: Processing range is 125–150 degrees F. when utilizing 20 SCFM air flow through 1/16 inch bore in center of purge rod on CPC EZ500 dispensing gun.
+To produce foam with a uniform cellular structure, minimum 16 cells per linear inch, via a Carpenter Packaging Company 5500 dispensing system (1.8:1.0 liquid pressure to air pressure ratio pogo pump). The processing range temperatures are the initial liquid dispensing temperatures which produce acceptable foam at a 1:1 mixing ratio by volume.
*Pounds per cubic foot.

FIG. 1 shows that the cushioning properties of the control are identical to the cushioning properties of the present invention. In other words, while the cushioning properties remain essentially the same, the foam made by the present invention has the further advantage of having lower dispensing temperature and exotherm. A shock cushion curve describes a material in terms of the deceleration transmitted to an object falling on that material at different static loadings.

Further variations and modifications of the invention will become apparent to those skilled in the art from the foregoing and are intended to be encompassed by the claims appended hereto.

What is claimed is:

1. In the method of preparing and dispensing a polyurethane packaging foam comprising reacting polymeric isocyanate and polyoxyalkylated polyol precursors in the presence of water as the blowing agent, the improvement whereby the initial dispensing temperature of the reaction product of the isocyanate and the polyol is reduced and the exotherm of the reaction is also reduced which comprises adding a nucleating agent to at least one of said precursors prior to said reaction, said nucleating agent being present in an amount sufficient to lower the dispensing temperature and reduce the exotherm of the reaction producing the polyurethane, wherein methyl formate is added as said nucleating agent to said polymeric isocyanate precursor in an amount of less than or equal to 1 percent of said polymeric isocyanate precursor and methanol is added as said nucleating agent to said polyoxyalkylated polyol precursor in an amount of less than or equal to 1 percent of said polyoxyalkylated polyol precursor.

2. The method according to claim 1, wherein said methyl formate is present in an amount of from 0.5 to less than about 1 percent of said polymeric isocyanate precursor and said methanol is present in an amount from 0.5 to less than about 1 percent of said polyoxyalkylated polyol precursor.

* * * * *